United States Patent [19]

Long

[11] Patent Number: 5,239,809
[45] Date of Patent: Aug. 31, 1993

[54] APPARATUS FOR FEEDING PACKAGES FROM A WEB OF PACKAGES TO A RECEPTACLE

[76] Inventor: John D. Long, 41 Lamont Avenue, Scarborough, Ontario, M1S 1A8, Canada

[21] Appl. No.: 836,750

[22] Filed: Feb. 19, 1992

[51] Int. Cl.[5] ............................................. B65B 61/06
[52] U.S. Cl. ........................................ 53/513; 83/422; 198/626.6
[58] Field of Search ....................... 53/513, 516, 520; 198/626.6, 626.3, 626.1, 626.2; 83/422, 424

[56] References Cited

U.S. PATENT DOCUMENTS

| | | |
|---|---|---|
| 3,631,651 | 1/1972 | Kopp .................................... 53/513 |
| 3,881,645 | 5/1975 | Kopp .................................. 53/513 X |
| 4,073,378 | 2/1978 | Jordan et al. ................. 198/626.6 X |
| 4,570,418 | 2/1986 | Gino ................................. 53/520 X |
| 4,995,225 | 2/1991 | Terminella et al. .................. 53/556 |
| 5,090,557 | 2/1992 | Carmen ............................ 198/626.1 |
| 5,094,443 | 3/1992 | Young, Jr. ..................... 198/626.3 X |

Primary Examiner—James F. Coan

[57] ABSTRACT

A web of variable shaped packages is pinch fed in a delivery path by an underlieing endless belt and an overlying endless belt, the latter having flexible tubes thereon which conform to the shapes of the packages. The web is thus fed to a cutting station where individual packages are severed.

12 Claims, 7 Drawing Sheets

APPARATUS FOR FEEDING PACKAGES FROM A WEB OF PACKAGES TO A RECEPTACLE

BACKGROUND OF THE INVENTION

1. Field of the Invention

This invention relates to apparatus for feeding packages from a web of packages to a receptacle.

2. Description of the Related Art

It is known to provide toys, novelties and the like in boxes, such as breakfast cereal boxes for the amusement of children. For sanitary and safety reasons it has become desirable to package such toys, novelties and the like in packages, typically cellophane or polywrap packages. To form the article containing packages, a web, comprising a tube of film, is formed around a line of articles. A sealing head then seals across the web at intervals between articles.

Two major types of packaging have been in use. The first is the four-sided seal where the web is sealed along both side longitudinal edges to form the tube of film and is also sealed transversely at intervals with the result that individual packages have four seals. Second is the bottom crimp seal where a single central longitudinal seal is formed along the back of the web to form the tube of film; individual packages then have three seals: the central longitudinal seal and two transverse seals.

It is relatively easy to provide a conveyor for moving a web with two longitudinal side seals, however, it is considerably more difficult to convey webs having a bottom seal. It has been attempted in the past to convey these bottom crimp seal webs on vacuum belts but the webs tend to twist or corkscrew breaking the vacuum and making conveying difficult. With bottom sealed webs a knife is typically incorporated in the sealing head which cuts individual packages from the web after each tranverse seal is made; the individual packages are then manually dropped into cereal boxes. Such a process is labour intensive and costly.

The present invention seeks to provide conveying apparatus for handling webs particularly of the bottom crimp seal type.

SUMMARY OF THE INVENTION

According to the present invention there is provided apparatus for feeding packages from a web of packages to a receptacle; comprising a first conveying means for delivering a web of packages from storage to a first station on a delivery path; second conveying means located at said first station on the opposite side of said path to said first conveying means and cooperating therewith, by pinching said web therebetween, to move said web of packages from storage along said path to a severing station thereon, said second conveying means comprising a driven endless belt having a plurality of flexible protuberances outstanding therefrom; cutting means at said severing station for severing packages from said tape; and third conveying means located along said path at a further station remote from said first and severing stations, and adapted to deliver severed packages from said severing station to an off-loading point along said path.

A fourth conveying means is located at the further station on the opposite side of the path to the third conveying means and cooperating therewith to deliver the severed packages to the offloading point. The first conveying means and the fourth conveying means are located in line with each other and beneath the second and third conveying means respectively.

The third conveying means is a driven endless belt operatively arranged parallel to the delivery path and having a plurality of flexible protuberances outstanding therefrom.

According to a further feature of the invention the first and second conveying means have a common drive member and preferably the third and fourth conveying means are driven independently of the first and second conveying means by a further drive member. Conveniently the drive members may be variable speed motors.

According to still a further feature of the invention, adjustment means is operatively connected to the second conveying means to vary its spacing from the first conveying means whereby to vary the depth of the delivery path at the first station. Similarly, adjustment means may be operatively connected to the third conveying means to vary its spacing from the fourth conveying means whereby to vary the depth of the delivery path at the further station.

According to another preferred feature of the invention the first conveying means may be a driven endless conveyor belt conveyor and the fourth conveying means may be a driven endless conveyor belt or a roller conveyor.

The present invention also provides, according to one of its features, a product or web position detector operatively connected with means to control the cutting means and this detector may be an optical detector located at the severing station or at another point on the machine.

In order to provide for quick set-up, ease of maintenance and cleaning, each of the driven endless belts having the plurality of flexible protuberances thereon may be pivotably mounted at one end for rotation away from the first and fourth conveying means.

According to still a further feature of the invention a movable stand is provided, including a wheeled base having an upstanding column thereon and frame means are provided for mounting the four conveying means in a unitary semaphore-arm fashion on the column. This permits adjustment of the angle between the column and the frame means. Preferably a tape storage bin may be provided on the stand.

BRIEF DESCRIPTION OF THE DRAWINGS

The following is a description by way of example of one embodiment of the present invention reference being had to the accompanying drawings in which.

DESCRIPTION OF THE PREFERRED EMBODIMENT

Figure 1:
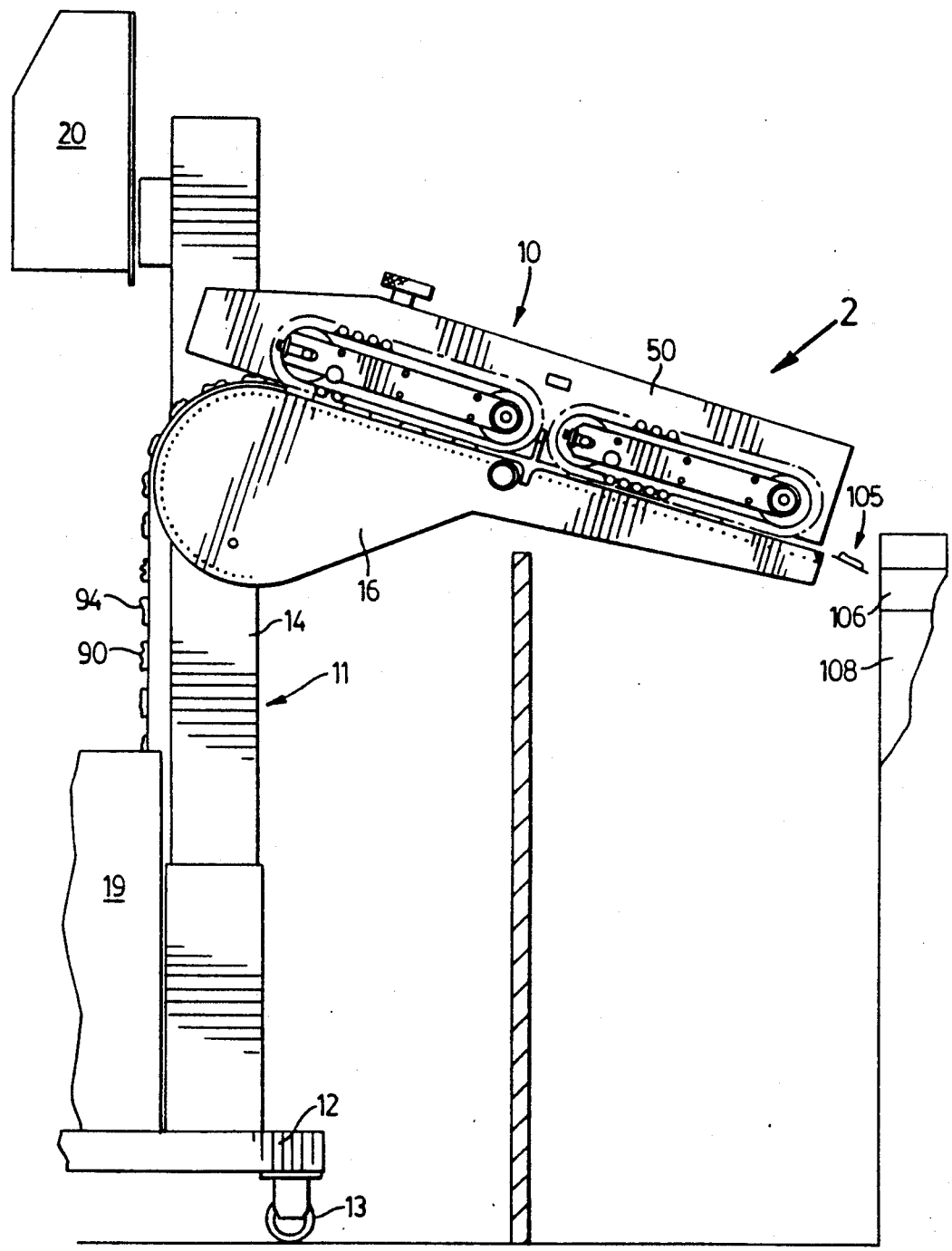
FIG. 1 is a side elevation of the feeding apparatus mounted on a movable stand.

Referring now to the drawings, in FIG. 1 the apparatus 10 for feeding packages from a web of packages is shown mounted on a movable stand 11. The stand 11 has a base 12 having floor engaging wheels 13 therebeneath and an upstanding column 14.

Package feeding apparatus 10 is mounted to the column 14 in semaphore-arm fashion. Adjusting slots and bolts 18 (see FIG. 3) are provided to permit the adjustment of the angle between the column 14 and the package feeding apparatus.

A storage bin 19, for storing a web of packages may conveniently be provided on the base 12 of the stand 11.

A control panel 20 mounted at the top of the column 14 houses the microprocessor for operating the apparatus 10; the control panel also provides air and electrical supplies for the operation of the apparatus.

Figure 2:
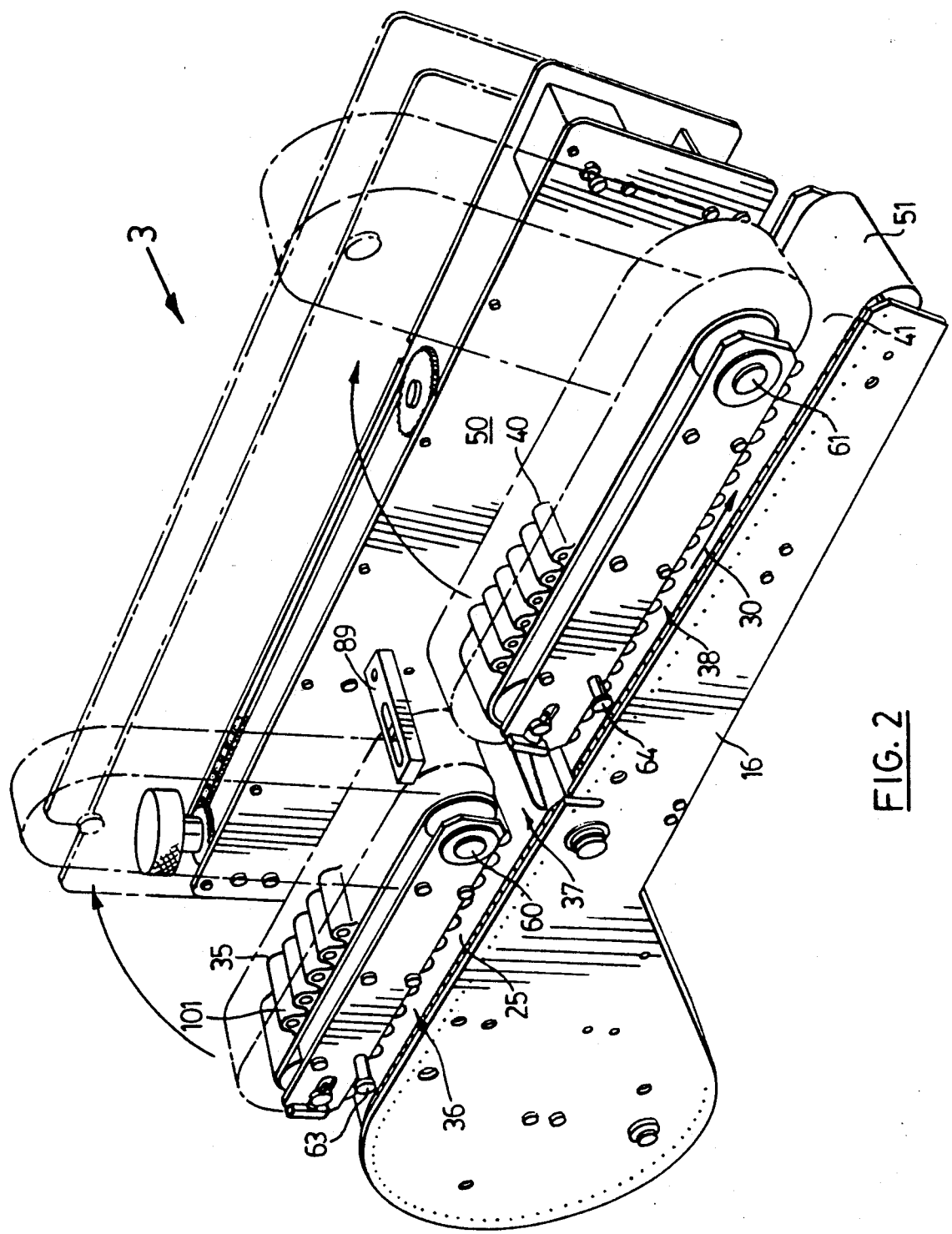
FIG. 2 is a perspective view of the conveyors, looking in the direction of the arrow '2' in FIG. 1.
Figure 4:
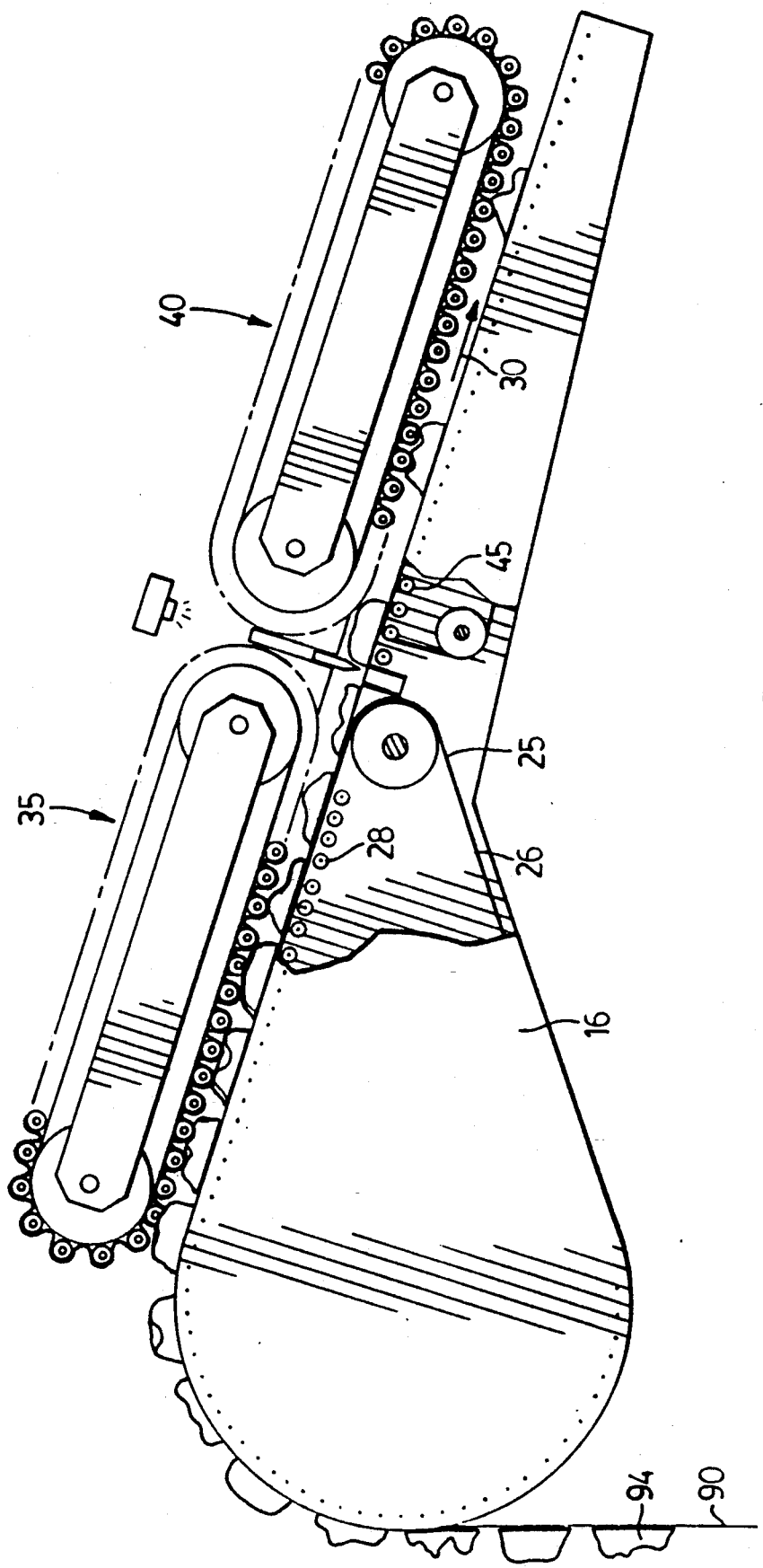
FIG. 4 is a detail of the conveyor, partly in section, looking from the opposite side of FIG. 3.

The packaging apparatus comprises a lower frame member 16 and an upper frame member 50. As best seen in FIGS. 2 and 4, a first conveyor 25 comprises an endless belt 26 arranged in substantially triangular configuration on the frame member 16 and passes over a set of rollers 28 extending along the delivery path, indicated in the drawings by the arrow 30. Endless belt 26 has a flat outside surface. A second conveyor 35 is positioned on the opposite side of the delivery path 30 to the first conveyor 25 and forms with it a first station 36. The form of the second conveyor is important and will be described in more detail hereinafter.

Farther along the delivery path 30 is a package severing station 37 (also to be described in more detail hereinafter) and a further station 38 is located farther down the delivery path 30. A third conveyor 40 of similar construction to the second conveyor 35 is positioned at the further station 38. A fourth conveyor 41 is located beneath said third conveyor 40 and in line with said first conveyor 25. The fourth conveyor is shown here as an endless belt 51 arranged in substantially rectangular configuration on the frame member 16 and passes over a set of rollers 45 extending along the delivery path 30.

Figure 3:
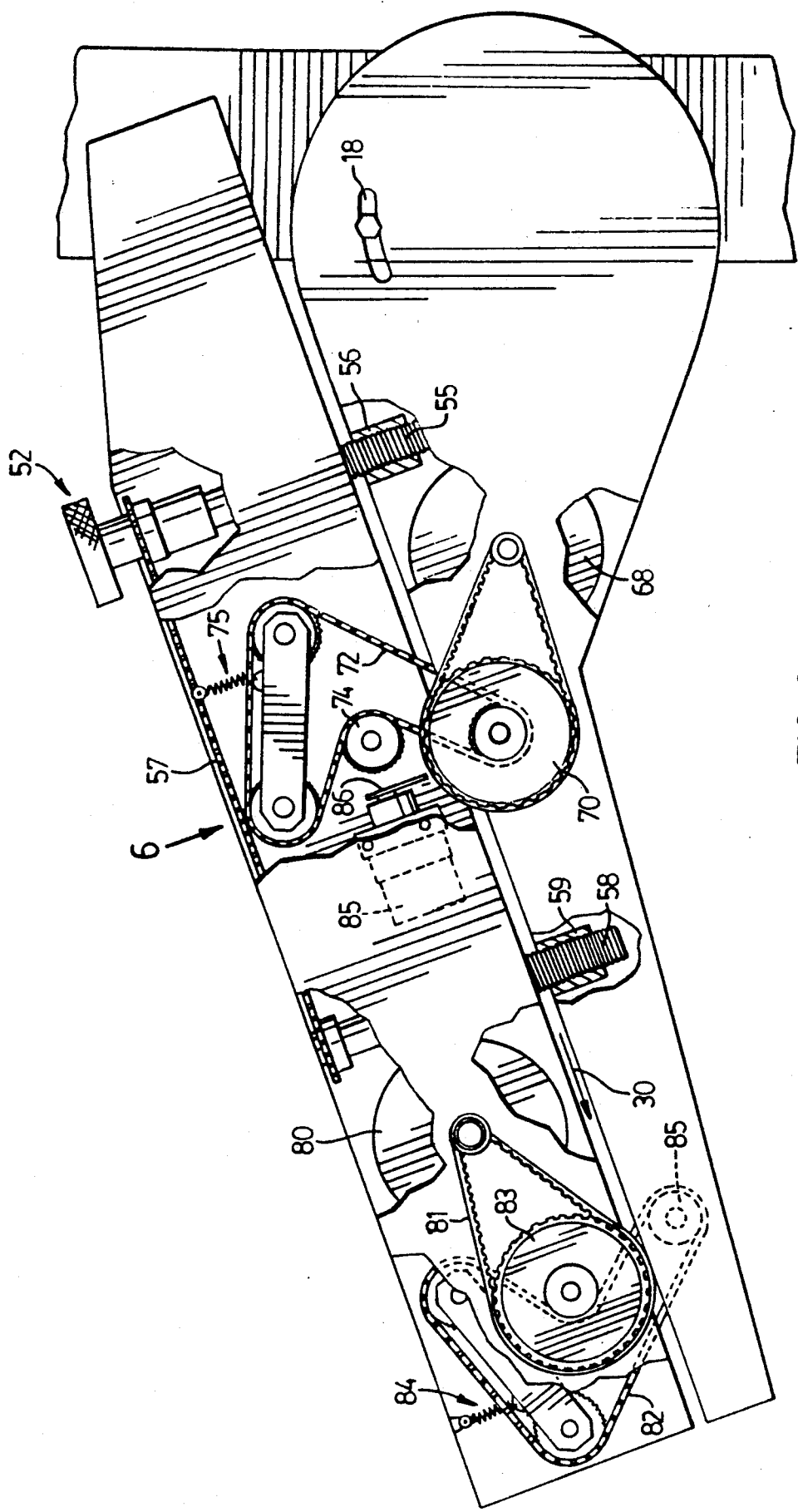
FIG. 3 is a detail, partly in section, of the conveyor driving mechanisms, looking in the direction of the arrow '3' in FIG. 2.

As seen, particularly with reference to FIGS. 1, 2 and 3, the second and third conveyors 35 and 40 are mounted on upper frame member 50. The upper frame member 50 may be raised and lowered relative to the lower frame member 16 by means of a threaded nut and bolt mechanism 52 (see particularly FIG. 3). By turning the knurled nut 52, its screw thread 55 is moved into, or out of, a threaded bore 56 in the lower frame member 16 and a chain, or like drive, 57 moved by the nut 52 turns a remote pin the screw thread 58 of which is rotated in its threaded bore 59 on the lower frame member 16 to move the upper frame member 50 towards and away from the lower frame member 16 whereby to vary the depth of the path 30 at the first and further stations 36, 38 to accommodate various sizes of packages to be delivered by the apparatus 10.

As seen in FIG. 2 the conveyors 35 and 40 are rotatably mounted on the frame member 50, at 60 and 61 and can be swung clockwise about their pivots 60 and 61 to the chain dotted position shown in FIG. 2, for quick set-up, cleaning or repair. Knobs 63 and 64 facilitate the swinging of conveyors 35 and 40.

The belt 26 of the first conveyor 25 and the second conveyor 35 are driven by a variable speed motor 68 on the lower frame member 16, which motor is seen in FIG. 3. With further reference to FIG. 3, the variable speed motor 68 drives a toothed belt 69 which in turn drives the sprocket 70 which moves the belt 26. A chain, or the like, drive 72 drives the sprocket 74 to operate conveyor 35. The chain 72 has a spring loaded tensioning device 75 to maintain tension in the belt 72 accommodating for different depths of the path 30.

The third conveyor 40 and the endless belt 51 of the fourth conveyor 41 are driven by a second variable speed motor 80 mounted in the upper frame member 50 and this motor 80 drives a toothed belt 81 which in turn drives the sprocket 83 which moves the belt 51. A chain, or the like, drive 82 drives the sprocket 85 to operate conveyor 40. The chain 82 has a spring loaded tensioning device 84 to maintain tension in the chain 82 accommodating for different depths of the path 30.

Figure 5:
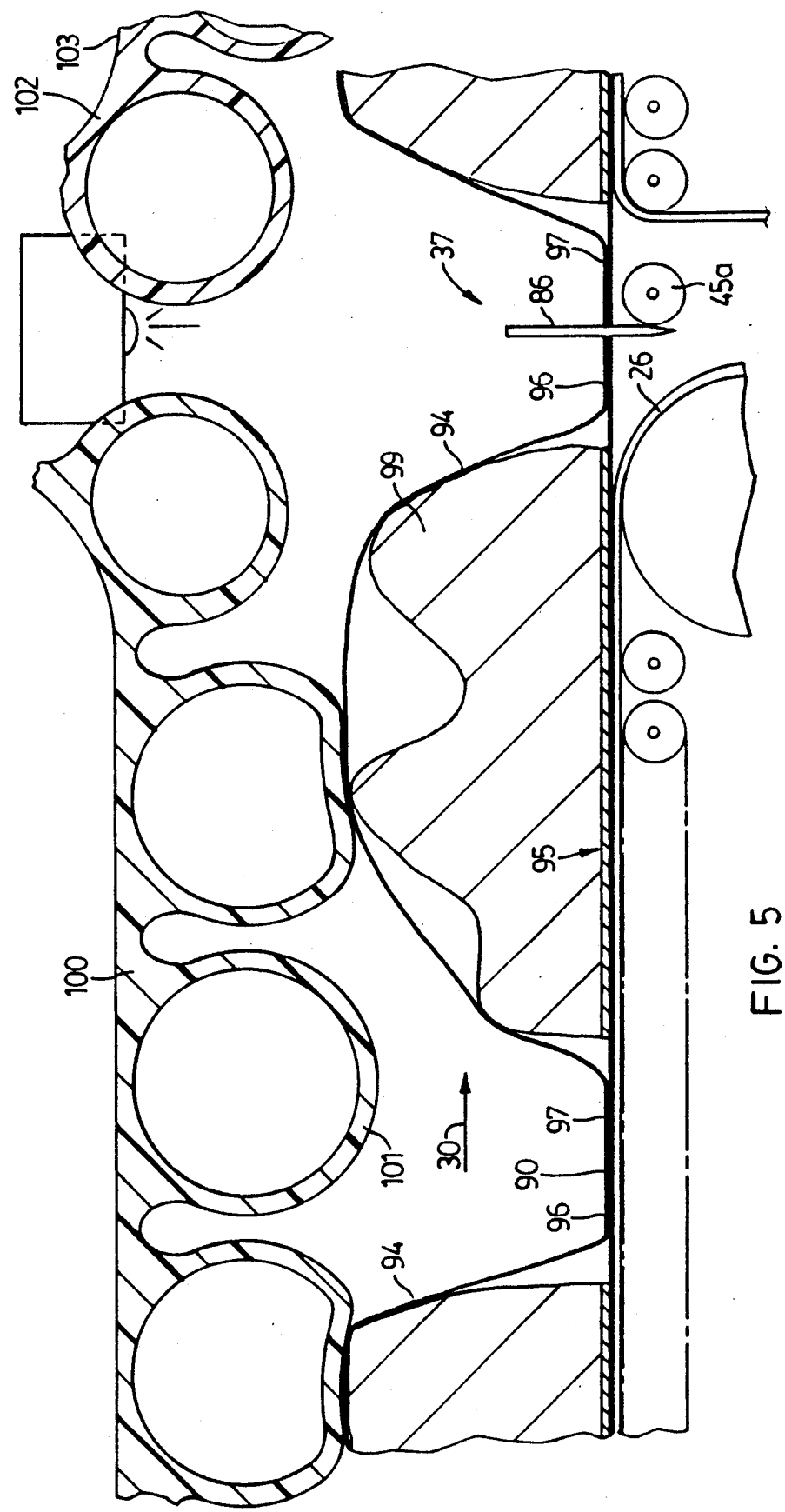
FIG. 5 is a detail to an enlarged scale of the conveyor and the severing device.
Figure 6:
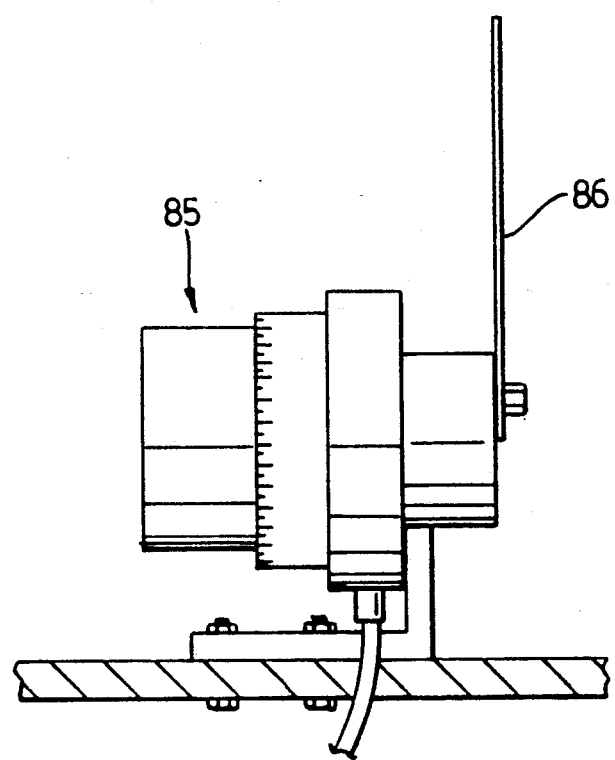
FIG. 6 is a detail of the severing device.

At the severing station 37 there is provided a cutter 85, of known design, having a knife 86 (see particularly FIGS. 5 and 6). The cutter 85 is mounted on the upper frame member 50 and, as shown in FIG. 6 is pneumatically driven by air delivered on the hose 88 from the control panel 20. The knife 86 may be either single edged or doubled edged so that it can cut on both up and down strokes or it may, for high speed purposes, be a rotary knife As seen in FIG. 5, a roller 45a upstream of the fourth conveyor 41 may act as an anvil for the knife 86. Operation of the cutter 85 is controlled by the microprocessor at the control panel 20 in response to an article or web position detector signal. In the embodiment shown, the position detector is an optical sensor or detector 89 of known configuration.

Stored in the bin 19 is a web of packages 90. The web 90 is of cellophane, poly or plastic material and is bottom crimp sealed centrally of its underside. The web incorporates a plurality of packages 94 formed by a seal transversely across the web at the leading edges 96 and the trailing edges 97 of the packages. Each package 94 contains an odd-shaped article 99 and a flat backing sheet 95 so that the back of the packages are flat and the top surface of the packages are of irregular shape (see FIG. 5).

Because the web 90 has a bottom crimp seal it is difficult to handle and to this end the present invention provides the second conveyor 35 in the form of an endless belt 100 incorporating a plurality of resilient tubes 101 extending transversely of the delivery path 30 (see particularly FIG. 2 and FIG. 5). The belt 100 is driven by sprocket 74. The tubes incorporated in the belt are hollow, thin-walled and made from a rubber-like substance and because the second conveyor 35 is adjustable to vary the width of the delivery path 30 at the first station 36, it is possible to locate the second conveyor 35 so that the tubes 101 contact the top surface of packages 94 of the web 90 at the first station and cooperate with the flat outside surface of belt 26 of the first conveyor 25 which contacts the flat back of the packages to pinch the packages 94 between the first and second conveyors 25, 35. The multiplicity of flexible tubes 101 accommodate themselves to the odd-shaped top surface of the packages 94 and together with the belt 26 of the first conveyor 25 positively propel the packages 94 along the delivery path 30 from the supply bin 19. The flat outside surface of belt 26 prevents the packages from warping and provides a good friction surface facilitating feeding of the web.

The web of packages is thus moved rapidly along the path 30 to the severing station 37. The optical sensor 89 detects the portion of the web between the packages 94 in any suitable fashion, for example the fact that the web 90 is transparent between the seals 96, 97 permits the optical sensor 89 to realize that there is no package at the severing station and a signal is sent from the optical sensor 89 to the microprocessor to operate the cutter 85. The blade 86 severs the leading package 94, which has now passed through the severing station 37 into the further station 38 downstream on the delivery path 30, from the web 90. During cutting, the first 25 and second 35 conveyors are stopped. The flat outside surface of belt 26 assists in permitting accurate stopping of the web of packages. The third conveyor 40 and fourth conveyor 41 pick up the severed individual package and move it through the further station 38 along the conveyor path to the off-loading point 105 where the severed package is projected into a receptacle 106, say a cereal box on a loading line 108. The individual variable speed drives of the first and second conveyors and the third and fourth conveyors enable the microprocessor to drive the feeding apparatus in any desired sequence. For example, the third and fourth conveyors may propel individual packages along the delivery path through the further station into the receptacle 106, or may deliver two individual packages substantially at the same time, to the receptacle, or whatever. Further, if there happens to be a fault in the web, for example, if the device assembling the web fails to load an article in an individual package so that the web has to travel twice as far before a loaded package is detected by the optical sensor 89, the microprocessor can control the drive speed of the third and fourth conveyors to make the necessary accommodation.

As shown in the preferred embodiment described, the third conveyor 40 is constructed similarly to the second conveyor 35 and the flexible tubes 102 of the endless belt 103 of this conveyor engage and propel the individual packages 94 severed at the severing station 37 along the delivery path 30.

Clearly the third conveyor 40 is height adjustable relative to the fourth conveyor 41 to provide a similar depth to the delivery path 30 at the further station 38 as is provided at the first station 36.

Figure 7:
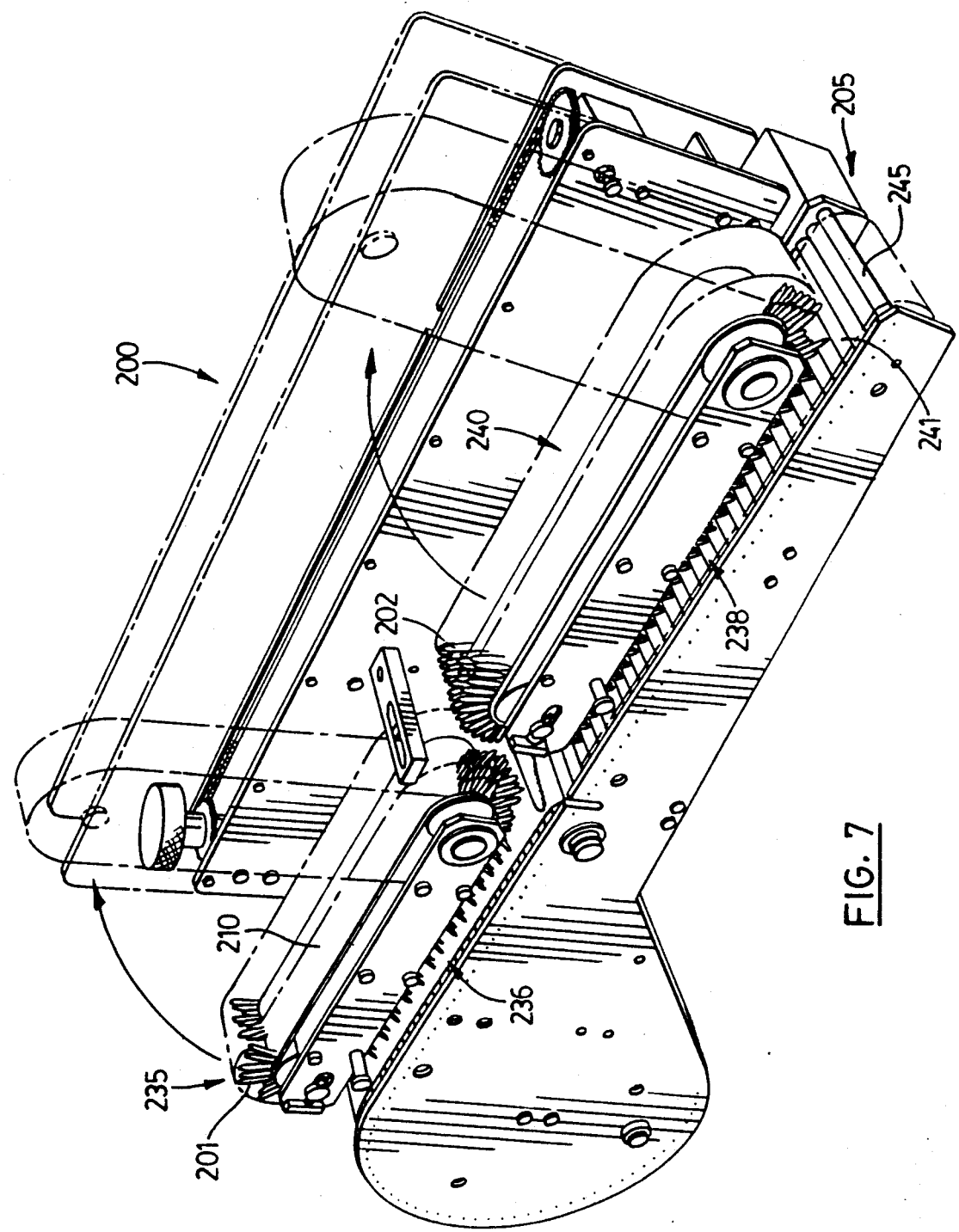
FIG. 7 is a perspective view of another embodiment of the conveyors of this invention.

While it it preferred that the fourth conveyor be driven to facilitate high speed operation, it will be apparent that for slower applications, this is not necessary, particularly when the delivering apparatus 10 is downwardly inclined. FIG. 7 illustrates an alternate embodiment of the invention wherein the fourth conveyor 241 of apparatus 200 comprises rollers 245 which are free to rotate but are not driven by any drive mechanism. Furthermore, a plurality of upstanding flexible fingers 201 extend from the endless belt 210 of the second conveyor 235. The fingers 201 are made from a rubber-like substance. Similar fingers 202 extend from the third conveyor 240. In all other respects, the apparatus 200 of FIG. 7 is identical to the apparatus 10 of FIGS. 1 through 6. The operation of the apparatus 200 is similar to that of the apparatus 10 with the packages 94 of the web 90 pinched between the fingers 201 of coveyor 35 and the first conveyor at the first station 236 and pinched between the fingers 202 of the third conveyor 240 and the rollers 245 of the fourth conveyor 241 at the further station 238. The friction achieved between the packages and the tubes 201 is sufficient to propel the packages, particularly when the delivering apparatus is downwardly inclined so that the roller conveyor 241 with its rollers 245 is sufficient to deliver the severed packages 94 with the desired degree of control, to the off-loading point 205.

Because of its portable nature, the apparatus 10 of FIGS. 1 through 6 and the apparatus 200 of FIG. 7 may be moved from site to site to deliver different forms of packages to different production lines.

It will be further understood that under certain circumstances the third conveyor could have a configuration other than that shown but because of the nature of the articles being handled a duplication of the form of the second conveyor is preferred for the third conveyor.

While the package feeding apparatus of this invention has been described for use with a bottom crimp seal web, it also has utility when used with a four sided seal web. Other modifications will be apparent to those skilled in the art and, therefore the invention is defined in the claims.

What is claimed is:

1. Apparatus for feeding packages from a web of packages to a receptacle; comprising a first conveying means for delivering a web of packages from storage to a first station on a delivery path; second conveying means located at said first station on the opposite side of said path to said first conveying means and cooperating therewith, by pinching said web therebetween, to move said web of packages from storage along said path to a severing station thereon, said second conveying means comprising a driven endless belt having a plurality of flexible protuberances outstanding therefrom; cutting means at said severing station for severing packages from said tape; third conveying means located along said path at a further station remote from said first and severing stations, and adapted to deliver severed packages from said severing station to an offloading point along said path; fourth conveying means located at said further station on the opposite side of said path to said third conveying means and cooperating therewith to deliver said severed packages to said off-loading point, said third conveying means comprising a driven endless belt operatively arranged parallel to said path and having a plurality of flexible protuberances outstanding therefrom said first conveying means and said fourth conveying means being located in line with each other and beneath said second and third conveying means respectively.

2. Apparatus as claimed in claim 1 in which said flexible protuberances comprise upstanding fingers.

3. Apparatus as claimed in claim 1 in which said flexible protuberances comprise tubes lieing transversely of said path.

4. Apparatus as claimed in claim 1 further comprising a web position detector operatively connected with means to control said cutting means.

5. Apparatus as claimed in claim 1 in which said first and second conveying means have a common drive member.

6. Apparatus as claimed in claim 5 in which said third conveying means is driven independently of said first and second conveying means by a further drive member.

7. Apparatus as claimed in claim 6 in which said fourth conveying means is driven by said further drive member.

8. Apparatus as claimed in claim 1 in which each of said second and fourth conveying means is pivotably mounted at one end for rotation away from said first and fourth conveying means.

9. Apparatus as claimed in claim 1 further comprising a movable stand including a wheeled base, and upstanding column thereon and frame means for mounting said four conveying means in a unitary semaphore-arm fashion on said column, whereby to permit adjustment of the angle between said column and said frame means.

10. Apparatus as claimed in claim 1 in which adjustment means is operatively connected to said second conveying means to vary its spacing from said first conveying means whereby to vary the depth of the delivery path at said first station and in which further adjustment means is operatively connected to said third conveying means to vary its spacing from said fourth conveying means whereby to vary the depth of the delivery path at said further station.

11. Apparatus as claimed in claim 1 in which said fourth conveying means is a roller conveyor.

12. Apparatus as claimed in claim 11 in which said fourth conveying means is a driven endless belt conveyor.

* * * * *